H. L. TANNER.
SYSTEM OF ELECTRICAL DISTRIBUTION.
APPLICATION FILED AUG. 28, 1914.

1,276,827.

Patented Aug. 27, 1918.
3 SHEETS—SHEET 1.

WITNESSES:
E. J. Thompson
F. G. Narveson

INVENTOR.
HARRY L. TANNER.
BY Herbert H. Thompson,
ATTORNEY.

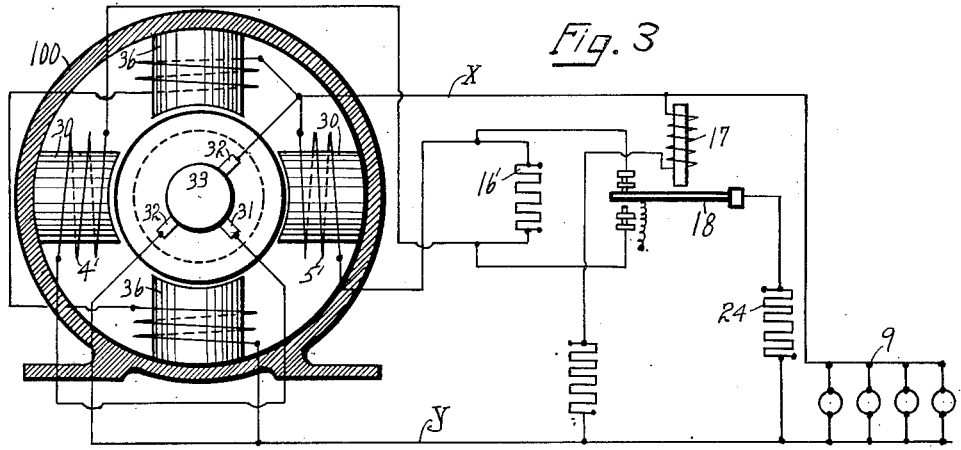
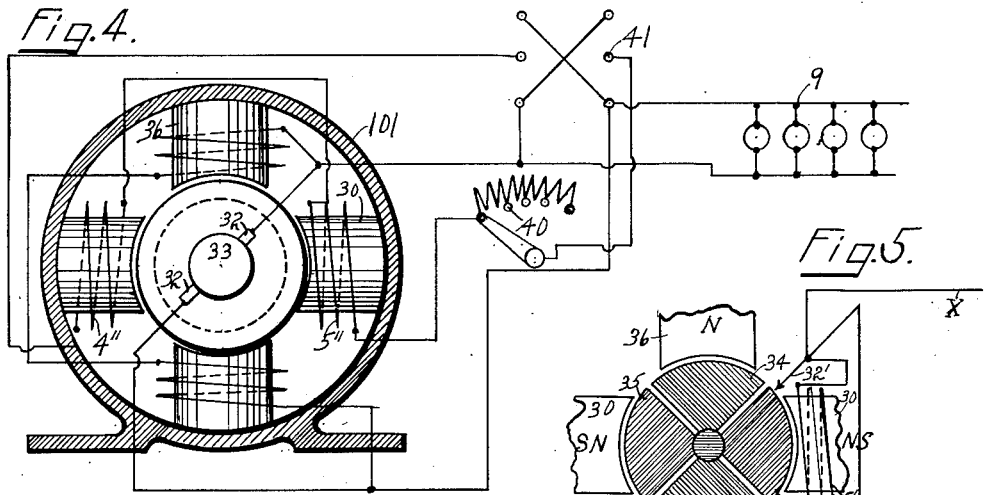
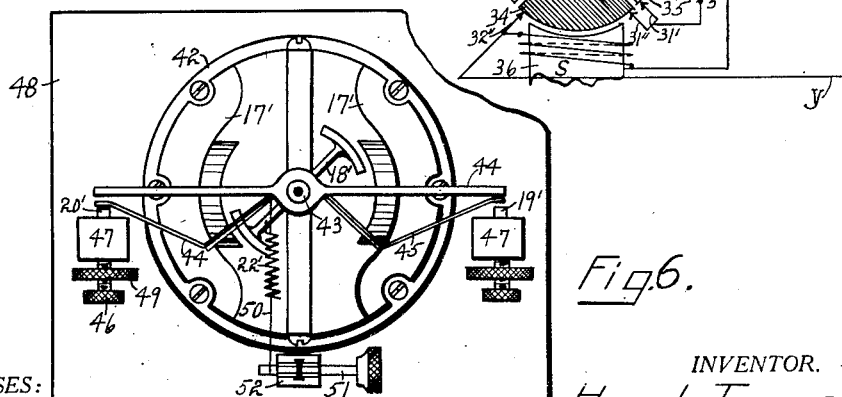

H. L. TANNER.
SYSTEM OF ELECTRICAL DISTRIBUTION.
APPLICATION FILED AUG. 28, 1914.

1,276,827.

Patented Aug. 27, 1918.
3 SHEETS—SHEET 3.

Inventor:
HARRY L. TANNER.
By Herbert H. Thompson
his Attorney.

UNITED STATES PATENT OFFICE.

HARRY L. TANNER, OF BROOKLYN, NEW YORK, ASSIGNOR TO SPERRY GYROSCOPE COMPANY, OF BROOKLYN, NEW YORK, A CORPORATION OF NEW YORK.

SYSTEM OF ELECTRICAL DISTRIBUTION.

1,276,827.  Specification of Letters Patent.  Patented Aug. 27, 1918.

Application filed August 28, 1914. Serial No. 859,087.

*To all whom it may concern:*

Be it known that I, HARRY L. TANNER, a citizen of the United States of America, residing at Brooklyn borough, New York, have invented certain new and useful Improvements in Systems of Electrical Distribution, of which the following is a specification.

This invention relates to systems of electrical distribution in which the primary source of power is either variable or intermittent, or both variable and intermittent. My invention is adapted for use as a system of electric lighting for railway trains and automobiles, and for many other uses which will be apparent to those skilled in the art. The principal object of my invention is to devise an apparatus by which the voltage on the load is kept constant, irrespective of whether the primary generator is running fast or slow, or has entirely stopped. Other objects of the invention will become apparent as the description proceeds.

There are two general systems of train lighting in use today one of which employs a single generator run at a comparatively constant speed by a steam turbine or engine on or near the locomotive, which furnishes current to all of the cars. Each car is equipped with a storage battery. The other uses a dynamo on each car belted to the axle, also with storage batteries. My system is adapted for either system, but it is especially useful in the axle system, since greater variation in the generator speed is found in it.

Figure 1:
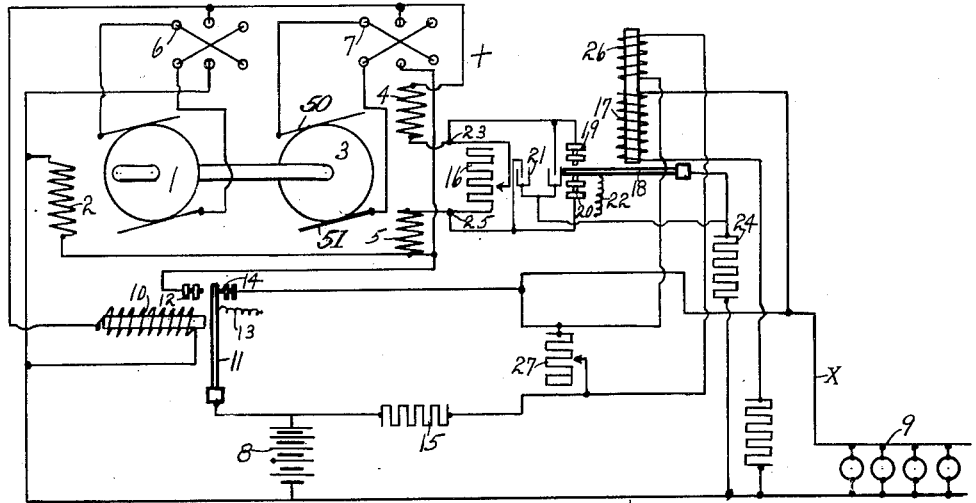
Figure 2:
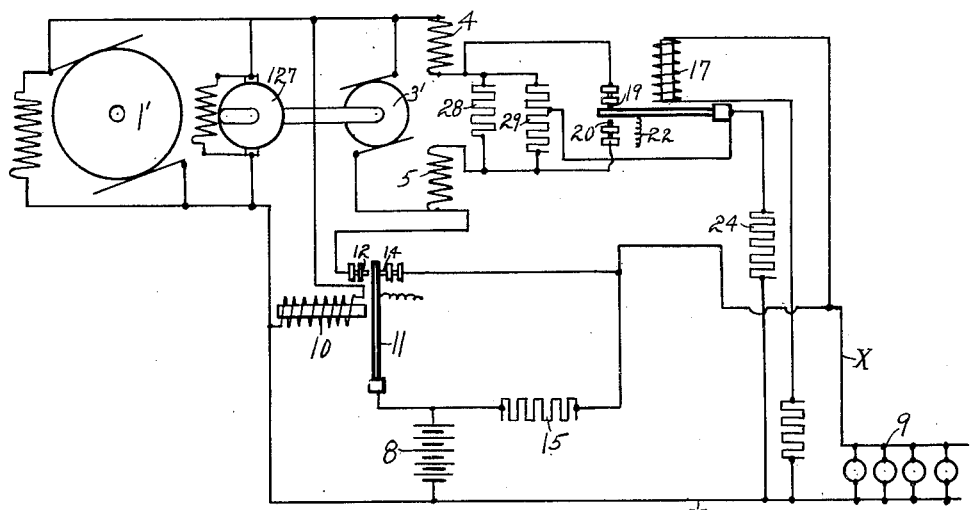
Figure 7:
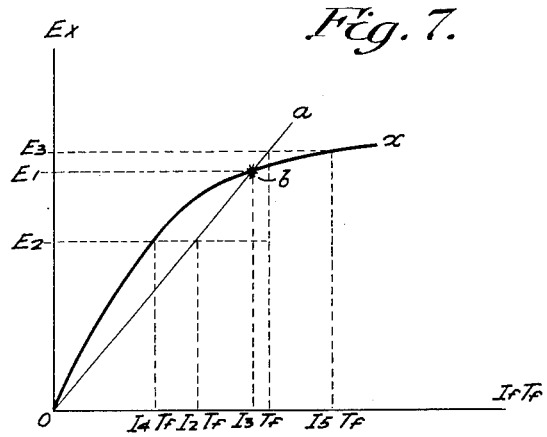
Figure 8:
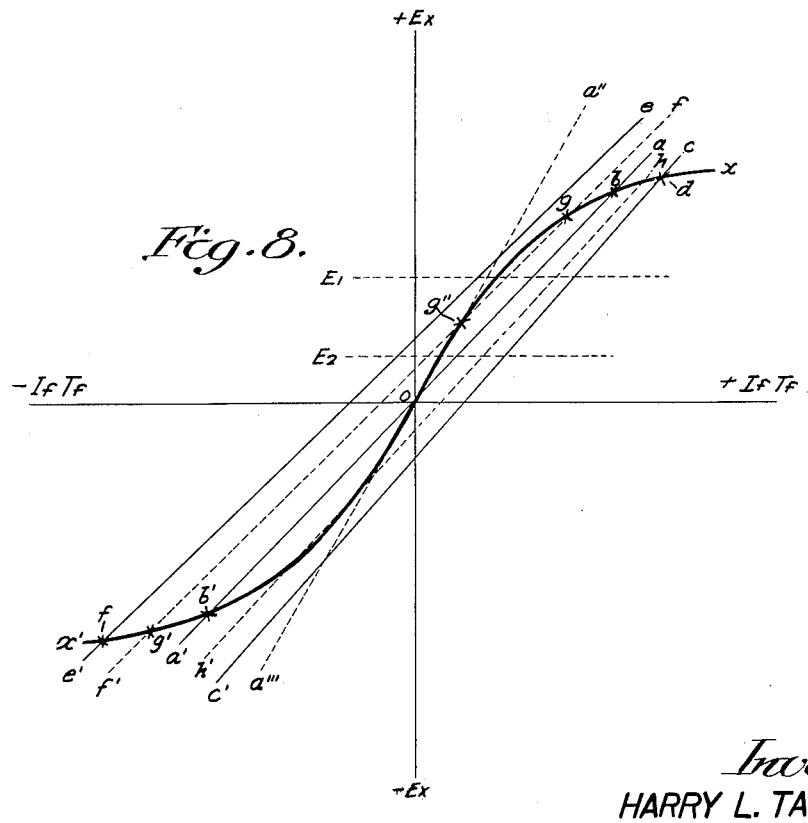

Several specific embodiments of my invention are shown on the drawings, in which Figure 1 is a wiring diagram of an axle system of car lighting constructed according to my invention. Fig. 2 is a similar diagram of my invention as applied to the other system of car lighting referred to above, showing also slight modifications. Fig. 3 is diagrammatic view of a single dynamo electric machine adapted to perform the functions of both machines shown in Fig. 1. Fig. 3 also shows a self regulating system without the use of storage batteries. Fig. 4 shows a modification of the machine shown in Fig. 3. Fig. 5 is a diagrammatic view showing the underlying principles of this type of machine. Fig. 6 is a front elevation of my special type of contact making voltage regulator. Figs. 7 and 8 each show curves used in explaining the theory of operation of my invention.

Referring specifically to Fig. 1, 1 represents any type of generator, adapted to be driven from a car axle. It is shown as provided with shunt type of field winding 2. Coupled with said generator is a dynamo-electric machine 3, provided with field windings 4 and 5. Reversing switches 6 and 7 are shown in the armature circuits, which may be operated by any means, automatic or otherwise, so as to reverse the armature circuits, when the car is run in the opposite direction, so that the machine may build up and so that the circuit through the secondary cells 8 will not be reversed. The load or translating devices 9 are connected permanently in the battery circuit, and the charging dynamos 1 and 3 are automatically connected with and disconnected from said circuit.

In my system, the connection is made to depend upon the voltage furnished by the charging dynamos or in other words, upon the voltage of the supply source, so that when its potential falls below a predetermined amount, it is thrown out and vice versa. This result is accomplished in the embodiment shown by means of a solenoid 10 in the supply circuit which will draw the armature 11 over against contact 12 if the solenoid is energized sufficiently to overcome the effect of spring 13, which normally holds said armature against contact 14. Since, however, the charging voltage of batteries is always somewhat higher than their discharging voltage, I employ special means to maintain the voltage on the load constant, said means being in the form of a resistance 15 in the battery circuit which is operative to reduce the voltage only when the supply circuit is connected. I accomplish this by shunting said resistance through a wire connecting contact 14 directly with the load circuit when the supply source is disconnected.

The generating set 1 and 3 is of special construction, designed to keep the voltage on the load constant through wide fluctuations in speed. Although it may be used in conjunction with batteries as shown in Figs. 1 and 2, its action is entirely independent of the batteries as shown in Fig. 3. The dynamo-electric machine 3 is placed in series between generator 1 and the load. As stated above the machine 3 is provided with field windings 4 and 5. No special winding is required, however, since machine 3 may be a standard shunt wound generator in every respect except that a resistance 16 is tapped in between the field coils thereof. Of course two separate windings may be provided, if desired, and also resistance 16 may be incorporated as a part of the field winding or made as a separate resistance as desired. Resistance 16 is made high enough so that the machine will not build up normally. A vibratory contact making voltage regulator is connected to each end of the resistance 16. Essentially, this instrument comprises a solenoid 17 connected in parallel with the load. The armature 18 of the solenoid vibrates between contact points 19 and 20, which are connected between the resistance and the coils 4 and 5 respectively. Condensers 21 may be provided to reduce sparking. A spring 22 opposes the pull of solenoid 17 and the two are so adjusted that the spring will hold the armature switch 18 against contact 20 until the voltage on the load exceeds a predetermined amount when the solenoid 17 will draw switch 18 against contact 19. In operation, the switch vibrates rapidly between the contacts.

Taking up now the action of the voltage regulator on the field coils 4 and 5 let us suppose that X is positive and that the generator 1 is furnishing a voltage considerably lower than that which is being maintained across load 9 and switch 18 is in contact with 20. Machine 3 will then act as a booster or generator, pumping current in the same direction as generator 1. If the upper brush 50 is at the higher potential, and switch 7 is thrown to the right, current will flow from this brush to coil 5, where it will divide, the main part going to the load, while the shunted portion will flow up through coil 5 and will divide at point 25, a portion going through switch 18, directly to a point of relatively low potential preferably to main return circuit $y$, through a resistance 24, while the remaining portion of the current will flow through resistance 16 and coil 4 and to the other brush 51. The apparatus is so designed that when these conditions are present, the booster will, under normal conditions, build the voltage up above the desired voltage, causing solenoid 17 to draw armature 18 into contact with point 19. This throws resistance 16 in series with coil 5 which would tend to reduce the current in said coil. At the same time a circuit from the positive to the negative side of the line is formed down through coil 4 to point 23, to contact 19 through armature 18 and resistance 24, thus introducing an electromotive force in coil 4, in such direction as to oppose the current then flowing. This new E. M. F. is at first opposed by the inductance of coil 4 and hence the effect at first is merely to reduce the current flowing through said coil. Thus the strength of both fields 4 and 5 will be lessened which will immediately reduce the boosting effect of the machine. If at this point in the cycle of operation the voltage is sufficiently reduced, the switch 18 will again be returned to point 20 and this cycle repeated. But if at said point the voltage is not sufficiently reduced the switch will remain up a little longer the induction of coil 4 will be overcome and the current through coil 4 will reverse and start to build up in the reverse direction. At this point it will be noted that coils 5 and 4 are opposing each other. Coil 4 will speedily build up stronger than coil 5 and as soon as this occurs the whole machine will start to act as a bucker and produce an electromotive force opposed to that of the main line. This will reduce the E. M. F. across coil 5 and will if continued produce a counter E. M. F. which will reverse it, causing it to assist coil 4 in producing a magnetic field. The above cycle is what would take place if switch 18 remains in contact with contact 19 for a sufficient length of time, but of course if at any time during that period the voltage on the load falls a sufficient amount, this contact will be broken and a contact through point 20 completed which will start a cycle similar to the one just described, but acting to cause the opposite effect, the first being as before to weaken the field of the bucker by a counter electromotive force impressed across coil 5 and a resistance thrown in circuit with coil 4. It will at once be recognized by those skilled in the art that the periods of time occupied in completing a cycle or a portion thereof are very short, so that in operation the switch 18 vibrates rapidly. I also wish it to be understood that the above description of the electrical reactions of the apparatus embodies only the most pronounced and essential features, the minor effects being omitted for the sake of clearness. What I have provided is a single regulating means which will not only vary the field strength of the machine 3, but will reverse the field, thus doubling the range of regulation.

Means may also be provided to cause the voltage on the load to rise when the load is heavy, to compensate for the R. I. drop. A second winding 26 is placed upon the solenoid 17, which winding is connected in series with the load. A variable resistance 27 may be connected in parallel with said winding so that the amount of current it receives may be regulated. Winding 26 opposes winding 17 so that the regulator will boost to a higher voltage when heavy currents are being taken. Coil 26 is shown as tapped into that portion of the circuit short circuited by contact 14, so that it will not be in the battery circuit proper.

Fig. 2 discloses an important modification, and illustrates the adaptability of my invention for different uses. The invention is here shown as a "booster", and may consist merely of my preferred form of machine 3' corresponding to machine 3, driven as a generator by any suitable source of power, such as motor 127. Machine 3' is connected in series with the main supply furnished by generator 1'. As applied to a train lighting system, 1' would be driven by means of a small steam turbine or the like near the engine, while a set 127–3' is placed on each car. The regulating features of this system are the same in principle as that shown in Fig. 1, and the parts are correspondingly numbered. Certain modifications and simplifications are shown however. Reversing switches 6 and 7 become unnecessary. The resistances corresponding to resistance 16 are made of somewhat different form to reduce sparking. A resistance 29 is provided a tap being taken into the said resistance direct to the wire containing resistance 24 and leading to the return wire $y$. By this means the circuit is never broken, so that sparking at points 19 and 20 is reduced. A second resistance 28, in multiple with 29 may also be used.

The use of my invention illustrated in this figure, i.e., as a voltage regulator for a portion of a variable main circuit, illustrates the adaptability of my invention for different uses. This figure also illustrates the preferred form of my invention. While the set 127–3' is referred to as a motor-generator set, in operation machine 127 acts as a generator when the voltage of the regulated line is materially above the voltage of the main line, or, in other words, when machine 3' is acting as a bucker.

I am aware that voltage regulators have been proposed, comprising a main generator and an auxiliary generator, both of which are provided with a plurality of separate, differential field coils. In all of these machines however, the wiring is very complicated and the set or machine is incapable of operation as a motor-generator, booster-bucker set. In my apparatus neither machine need be provided with any special windings, and furthermore machine 3 or 3' is entirely independent of machine 1 or 127. Thus in Fig. 2, machine 127 could be replaced by any other type of engine or motor without materially affecting the operation of the regulator. In order that the theory upon which my regulator works may be clearly understood and its operation distinguished from existing types of regulators, reference is had to Figs. 7 and 8.

In Fig. 7 $o,b,x$, is the saturation curve of the generator 3 in which terminal voltages are plotted as ordinates, and ampere turns field excitation are plotted as abscissæ. The straight line $oba$ is a curve between terminal voltage as ordinates and the ampere turns which would be produced in the field with this same voltage applied to the field terminals and the resistance 16 shunted out or omitted.

From these two curves it will be seen that the normal voltage of the machine would be $E_1$, for the following reason: Suppose that the terminal voltage momentarily dropped to $E_2$. The voltage applied to the field would also drop to $E_2$, and the field excitation would drop to $I_2T_t$, but as only $I_4T_t$ ampere turns are required to produce the terminal voltage $E_2$ it will be seen that the voltage will rise until $E_1$ is reached where the ampere turns of the field and the field excitation required to produce this voltage are the same. Similarly if the voltage momentarily rises to $E_3$, it is seen that the field excitation will become $I_3T_t$ while the field excitation $I_5T_t$ is required to produce this terminal voltage so the voltage will not be maintained but will drop back to $E_1$ where the field excitation is just sufficient to maintain the voltage.

Fig. 8 is similar to Fig. 7, excepting that it is plotted for both positive and negative values of terminal voltage for field excitation and that additional lines are added. The curve $aoa'$, which corresponds to the curve $oa$ of Fig. 7, becomes $cc'$ when armature 18 makes contact with 20, and it becomes $ee'$ when armature 18 makes contact with 19, the curves $cc'$ and $ee'$ being the algebraic sum of $aoa'$ and additional excitation due to the current which passes through contact 18 and resistance 24, this excitation being considered positive when armature 18 is in contact with 20 when the current passes through coil 5, and negative when in contact with 19, at which time the current passes through coil 4.

Suppose it is desired to maintain the voltage at $E_1$. As the armature 18 will always be in contact with 19 or 20, the total field excitation must be either that shown by the intersection of the curve $cc'$ and the horizontal line $E_1$ or that shown by the intersection of the curve $ee'$ and the line through $E_1$. From the description of Fig. 7 it will be seen that if the machine is operating on curve $ee'$ the voltage will be reduced until point $f$ is reached; and if operating on curve $cc'$ the voltage will increase until point $d$ is reached.

Suppose the armature to be in contact with 20, then the machine would be working on curve $cc'$ and the voltage will begin to rise; as soon as it rises a slight amount, however, solenoid 17 will become stronger, drawing armature 18 away from contact 20 and making contact with 19, when the machine will be operating on curve $ee'$. Then the voltage will begin to fall, until the solenoid 17 becomes weakened sufficiently to allow spring 22 to pull armature 18 back making contact with 20, after which the above cycle will be repeated.

For the machine to operate as described, resistances 24 and 16 must be given such values that curve $ee'$ will lie to the left of a tangent to curve $obx$, and curve $cc'$ will lie to the right of a tangent to $ob'x'$. Suppose this were not true but that the resistance were given such values as to make curve $ee'$ fall at $ff'$ and $cc'$ fall at $hh'$. If an attempt be then made to maintain the voltage at $E_1$ when the armature makes contact with 19, the field excitation will be greater than that required to maintain this voltage, and the voltage will rise until point $g$ is reached, where the voltage will "stick".

While the regulator normally operates in the cycle described, this may be modified slightly by designing the solenoid 17 and the armature 18 so that the armature 18 may be made to stand in a position where it will touch neither 19 nor 20. In this case resistance 16 must be of such value as to change curve $aoa'$ to some such curve as $a''oa'''$ where every part of section $oa''$ of the curve lies to the left of curve $obx$ and every part of the curve $oa'''$ lies to the right of curve $obx'$; in other words, the value of resistance 16 must be such as to kill the voltage of the machine when armature 18 makes contact with neither 19 nor 20.

In Fig. 3 is shown a dynamo-electro machine 100 which performs the function of both machines 1 and 3 shown in Fig. 1. It embodies the same fundamental principles of operation, but only one armature winding and one commutator 33 are used. In the machine illustrated, the dynamo is a standard bi-polar shunt wound generator equipped with an auxiliary pair of poles 30, and an auxiliary brush 31. The main brushes 32 correspond in number to the armature windings and are positioned in the commutating zones on the commutator, which are found to occur when the armature coils are passing between two poles. Brush 31 is positioned at a point of different potential on the commutator from the main brushes, and in the type of machine illustrated is preferably placed midway between them as poles 30 and 36 are shown as being of the same width. The windings 4' and 5' on the auxiliary poles 30 correspond to field windings 4 and 5 respectively. They are connected at one end to the auxiliary brush 31, and at other end to the external circuit $x$. A resistance 16' and the voltage regulator are placed between the two as before. The auxiliary fields are thus made to oppose or aid the main fields 36.

The general theory of the operation of this machine and its analogy to the set shown in Fig. 1 is shown in Fig. 5. At any given instant the armature may be considered to be divided by the brushes into two sections, one of which, 34 composes the two diametrically opposite quadrants under pole pieces 36, while the other 35 composes the two quadrants under pole pieces 30. Also since the brush 31 performs a double function, it is shown as two brushes 31' and 31". It will readily be seen that that section of the armature between brushes 31" and 32" (i. e. section 34) together with poles 36 corresponds to and performs the function of generator 1 in Fig. 1 while section 35, between brushes 31' and 32' corresponds to dynamo-electric machine 3 of Fig. 1. The windings on poles 36 are shunted across the main supply wires, as is the case with field coil 2, while coils 4' and 5' are placed in series with brush 31 and the external circuit as explained above. If brush 32" were the negative main line brush and no current were flowing through coils 4' and 5' brush 31" would furnish the entire potential of the line, brushes 31' and 32' being practically at the same potential. Now suppose the speed of the armature to be reduced so that the potential at brush 31" falls. The first slight resultant drop in the external circuit will immediately be detected by my voltage regulator, which will cause the right hand pole 30 to become a south pole and the opposite one a north pole by the means heretofore described and hence cause a rise in the potential from brush 31' to 32' which would exactly compensate for the loss of potential at brush 31", thus maintaining the external voltage constant. Similarly, if the speed of the armature was increased, the potential at 31" would rise and by means of the voltage regulator, the left hand pole 30 would become a south pole and the right hand a north pole. This would cause a fall in potential from brush 31' to 32' compensating for the increased voltage at 31".

The voltage regulator is the same type as that used in Fig. 1. No storage batteries are shown, however, to emphasize the fact that the operation of my regulator is in no way dependent upon batteries and that it is adapted for use in any circuit.

A modification 101 of the dynamo-electric machine 100 is shown in Fig. 4 The machines in Figs. 3 and 4 are shown as identical except that brush 31 is omitted on machine 101 and the winding 4" and 5" are connected through a manually or otherwise operated rheostat 40 and reversing switch 41, in multiple with the external circuit. We have, then, a multipolar generator with both primary and auxiliary pole pieces, an armature wound with reference to said primary poles only and brushes 32 to correspond to the armature winding positioned in the commutating zone. The rheostat 40 and reversing switch 41 may be operated to vary the strength or reverse the polarity of pole pieces 30 so that the same result is achieved as by use of the vibratory regulator. This form of machine is especially adapted where the speed of the source of power is constant most of the time but is subject to considerable changes at times, while the other forms are more adapted where the speed of the source of power is seldom steady.

The instrument which I term the master voltage regulator and which is shown diagrammatically in Figs. 1, 2, and 3 preferably assumes the form shown in Fig. 6. It is made in the form of a motor 42. The field windings 17' of this motor correspond to the solenoid 17, while armature 18' corresponds to armature 18. Armature 18' is mounted on shaft 43 on which is secured the bar 44. A spring 22' tends to draw the arm into contact with contact point 20' while the armature 18' is so placed that the torque exerted on it by solenoid 17' opposes the force of the spring and tends to draw the arm in contact with point 19'. The actual contacts are made through spring arms 44 and 45, which cause a wiping contact over points 20' and 19' so that the contacts may be kept clean. Contacts 19' and 20' are made in the form of screws 46 adjustable in threaded blocks 47 fixed on the base 48. Lock nuts 49 are also provided. The tension of spring 22' is rendered adjustable by securing one end to a thread 50 which is secured to a rod 51, rotatably mounted in the friction bearing block 52, so that the thread may be wound upon or unwound from said rod.

This type of contact making regulator possesses many advantages over the usual type, which is illustrated in the wiring diagrams, since it is perfectly balanced about every axis and hence will work in any position and when subject to jolts and jars which would seriously interfere with the existing type. In operation the arm 44 vibrates rapidly between points 19' and 20', causing a continual fluctuation in the impressed E. M. F. on the field coils 4 and 5, but the fluctuation is so rapid that the voltage on the load is kept constant.

From the foregoing it is believed that the operation of the several parts of my system will be clear and also that it will be apparent that certain of the features set forth in the appended claims are of great individual importance. To restate briefly the operation of the system as a whole, I will suppose that the car carrying the apparatus shown in Fig. 1 is at rest and the lights are burning. The battery will then furnish the entire supply and the main part of the current will flow through switch 11, contact 14 to supply wire $x$, since resistance 15 is shunted thereby. Now suppose the car to be gradually picking up speed. As soon as the generator 1 with the aid of the booster 3 is able to generate sufficient voltage, contact 14 is broken and 12 made, throwing in the generating set and thus both charging the batteries and lighting the lamps. The lamp current now however, will go through resistance 15 which allows a rise in voltage on the battery so that it may be charged. As the car speeds up, the supply voltage is prevented from rising by the booster-bucker and its regulating means, the boosting effect of which becomes less and less until it finally begins to buck or furnish a counter E. M. F. which effect becomes more powerful as the car speeds up. Although it thus acts to keep the voltage down, it does not cause an appreciable loss of power, as when acting in this capacity, it really acts as a motor and helps to drive the generator 1.

In accordance with the provisions of the patent statutes, I have herein described the principle of operation of my invention, together with the apparatus which I now consider to represent the best embodiments thereof, but I desire to have it understood that the apparatus shown is only illustrative and that the invention can be carried out by other means. Also, while it is designed to use the various features and elements in the combination and relations described some of these may be altered and others omitted without interfering with the more general results outlined, and the invention extends to such use.

Having now described my invention, what I claim and desire to secure by Letters Patent is:

1. A voltage regulator adapted to be connected with a line to be regulated comprising a dynamo-electric machine, a plurality of field windings thereon in series with one another, means for causing a drop in potential between said windings whenever current flows from one to another of said windings, and means for varying the potential drop between said windings responsive to variations in the voltage on the regulated line when said regulator is operatively connected to said line.

2. A voltage regulator adapted to be connected with a line to be regulated comprising a dynamo-electric machine, a plurality of field windings thereon in series with one another, means interposed between said windings for causing a potential drop therebetween whenever there is a flow of current from one to another of said windings, and means responsive to variations in the voltage of the regulated line when said regulator is connected to said line for completing a circuit around said first mentioned means.

3. A voltage regulator adapted to be connected with a line to be regulated comprising a dynamo-electric machine, a plurality of field windings thereon in series with one another and means for varying the potential drop between said windings responsive to variations in the voltage on the regulated line and also to variations in the amount of current taken by the said line when said regulator is connected to said line, the terminals of the series connection between said windings being at a different potential whenever current flows from one to another of said windings.

4. A voltage regulator adapted to be connected with a line to be regulated comprising a dynamo-electric machine, a plurality of field windings therefor in series with one another, a resistance placed between said windings in series therewith there being a flow of current through said resistance whenever current flows from one to another of said windings and means responsive to variations in the voltage of the regulated line for completing a circuit around said resistance when said regulator is connected to said line.

5. In combination, a line circuit, a voltage regulator therefor comprising a dynamo-electric machine, a plurality of field windings therefor in series with one another, a resistance placed between said windings in series therewith, means responsive to variations in the voltage of the regulated line for completing a circuit around said resistance from a point adjacent the connection of a winding with said resistance to a point of different potential and means for creating a difference of potential between said points.

6. In combination, a line circuit, a voltage regulator therefor comprising a dynamo-electric machine, a plurality of field windings therefor in series with one another, a resistance placed between said windings in series therewith, means responsive to variations in the voltage of the regulated line for completing a circuit around said resistance from a point adjacent the connection of either of said windings with said resistance to a point of different potential and means for creating a difference of potential between said points.

7. A voltage regulator comprising a dynamo-electric machine adapted to be placed in series with a variable line, a shunt field circuit therefor having a resistance high enough to prevent the building up of the machine, means for causing the building up of the machine by completing a circuit including a source of E. M. F. around a portion of the field winding, and means for driving said machine.

8. In combination, a line, a voltage regulator comprising a dynamo-electric machine in series with said line, a shunt field circuit therefor having a resistance high enough to prevent the building up of the machine, means connected to said line and responsive to variations in the voltage beyond the machine for causing the building up of the latter by completing a circuit, including a source of E. M. F., around a portion of the field winding, and means for driving said machine.

9. In combination, a line, a voltage regulator comprising a dynamo-electric machine in series with said line, a shunt field circuit therefor having a resistance high enough to prevent the building up of the machine, means connected to said line and responsive to variations in the voltage beyond the machine for causing the building up of the machine in either direction by completing a circuit around one portion or another of the field circuit.

10. In combination, a variable line, a voltage regultor comprising a dynamo-electric machine in series with said variable line, a shunt field circuit therefor having a resistance high enough to prevent the building up of the machine, means connected to said line and responsive to a predetermined change in the voltage beyond the machine for completing a circuit from a point of the field circuit nearer the regulated part of said line to a point of different potential, means for driving said machine, and means for creating a difference of potential between said points.

11. In combination, a variable line, a voltage regulator comprising a dynamo-electric machine in series with said variable line, a shunt field circuit therefor having a resistance high enough to prevent the building up of the machine, means connected to said line and responsive to a predetermined change in the voltage beyond the machine for completing a circuit from a point of the field circuit farther from the regulated part of said line to a point of different potential, means for driving said machine and means for creating a difference of potential between said points.

12. In combination, a supply line, a voltage regulator comprising a dynamo-electric machine in series with said line, a shunt field winding thereon, a resistance tapped in between the coils of said winding, means connected to said line and responsive to a predetermined change in the voltage of the line for completing a circuit from a point adjacent the connection of said resistance to the coil nearer the regulated part of said line, to a point of different potential, means for driving said machine and means for creating a difference of potential between said points.

13. In combination, a supply line, a voltage regulator comprising a dynamo-electric machine in series with said line, a shunt field winding thereon, a resistance tapped in between the coils of the said winding, means connected to said line and responsive to a predetermined change in the voltage of the line for completing a circuit from a point adjacent the connection of said resistance to the coil farther from the regulated part of said line, to a point of different potential, means for driving said machine and means for creating a difference of potential between said points.

14. In combination, a supply line, a voltage regulator comprising a dynamo-electric machine in series with said line, a shunt field winding thereon, a resistance tapped in between the coils of the said winding, means connected to said line and responsive to a variation in the voltage of the line for completing a circuit from a point adjacent the connection of said resistance to the coil nearer the regulated part of said line, to a point of different potential, upon a predetermined change in said voltage and for completing a similar circuit from a point adjacent the connection of said resistance to a coil farther from the regulated part of said line, upon an opposite change in said voltage, means for driving said machine and means for creating a difference of potential between said points.

15. In combination, a supply line, a voltage regulating dynamo comprising field coils and an armature, said armature being in series with one side of said line, one of said field coils being connected at one end to one side of said line, another of said field coils being connected at one end, to the same side of said line and means governed by the voltage of said line for alternately connecting the other ends of said above mentioned coils to the other side of said line.

16. In combination, a supply system, a load supplied thereby, means for regulating the voltage of said supply system comprising a dynamo-electric machine, a plurality of field coils connected in series thereon, and means responsive to variations in the voltage on the load to cause a variation in the electro-motive force across one of said coils whereby the resultant field current is increased, reduced or reversed, dependent upon the direction magnitude and duration of the initial voltage variation and upon whether that portion of the machine influenced by said field coils was acting as a bucker or as a booster at the time of the voltage variation.

17. The method of regulating the field of a voltage regulating dynamo-electric machine which consists in impressing a counter electro-motive force across a portion of the field winding and introducing a resistance in series with another portion of said winding to cause the current through the first mentioned portion to be first reduced and then reversed.

18. A method of maintaining a constant voltage on a variable line by the field regulation of a dynamo-electric machine, characterized by the following cycle as the supply voltage and power gradually increase from zero, first the building up of the field until the desired voltage is reached, second the simultaneous introduction of a counter electro-motive force across a portion of the field winding and a resistance in circuit with another portion of the field winding as said voltage is exceeded, third a reversal of the current in said first mentioned portion of the field winding, fourth the increase in the strength of said portion beyond the strength of said other portion and fifth the reversal of current in said other portion.

19. Means for regulating the voltage of a supply system, comprising a dynamo-electric machine, a plurality of field coils connected in series thereon, and means responsive to variations in the voltage on the load to cause a counter electro-motive force across one of said coils and a simultaneous introduction of resistance into another of said coils.

20. In combination, a supply line, a voltage regulating dynamo comprising a field winding in series with one side of said line, a connection between an intermediate point of said field winding and the opposite side of said line and means responsive to changes in voltage on said line for making and breaking said last named connection.

21. In combination, a line circuit, a voltage regulating dynamo connected therewith having a field winding of a plurality of parts, a resistance interposed between two of said parts, a source of E. M. F. and means for connecting said source of E. M. F. and said resistance in series with one or another of the parts of said field according as the voltage of the line circuit rises or falls.

22. In combination, a line circuit, a voltage regulating dynamo connected therewith having a field winding of a plurality of sections, a resistance interposed between two of said sections, a source of E. M. F. and means responsive to variations in voltage on the regulated line for connecting said resistance to said source of E. M. F.

23. In combination, a supply line, a dynamo comprising field coils and an armature, said armature being connected in series with one side of said line, a connection between one end of one of said coils and one terminal of said armature, a connection between one end of another of said field coils and the other terminal of said armature and means responsive to variations in voltage on said line for connecting the other ends of said last mentioned field coils to the other side of said line.

24. In combination, a supply line, a voltage regulating dynamo comprising an armature and a shunt field winding, said armature being in series with one side of said line, a plurality of taps from said shunt field winding, and voltage regulated means for connecting said taps to the other side of the line.

In testimony whereof I have signed my name to this specification in the presence of two subscribing witnesses, this 27th day of August, 1914.

HARRY L. TANNER.

Witnesses:
F. R. ALLEN,
CHARLES H. CONNER.